United States Patent
Kettle

(10) Patent No.: US 10,055,024 B2
(45) Date of Patent: Aug. 21, 2018

(54) GESTURE DETECTION AND COMPACT REPRESENTATION THEREOF

(71) Applicant: Maxim Integrated Products, Inc., San Jose, CA (US)

(72) Inventor: Paul J. Kettle, Redwood City, CA (US)

(73) Assignee: MAXIM INTEGRATED PRODUCTS, INC., Sunnyvale, CA (US)

( * ) Notice: Subject to any disclaimer, the term of this patent is extended or adjusted under 35 U.S.C. 154(b) by 0 days.

(21) Appl. No.: 15/707,734

(22) Filed: Sep. 18, 2017

(65) Prior Publication Data

US 2018/0004302 A1    Jan. 4, 2018

Related U.S. Application Data

(63) Continuation of application No. 14/792,029, filed on Jul. 6, 2015, now Pat. No. 9,766,710, which is a continuation of application No. 13/337,733, filed on Dec. 27, 2011, now Pat. No. 9,075,443.

(51) Int. Cl.
   *G06F 3/01*     (2006.01)
   *G06F 3/041*    (2006.01)
   *G06F 3/0488*   (2013.01)

(52) U.S. Cl.
   CPC ............ *G06F 3/017* (2013.01); *G06F 3/0416* (2013.01); *G06F 3/04883* (2013.01); *G05B 2219/23021* (2013.01)

(58) Field of Classification Search
   CPC ................ G05B 2219/23021; G06F 3/017
   See application file for complete search history.

(56) References Cited

U.S. PATENT DOCUMENTS

| | | |
|---|---|---|
| 2004/0151345 A1 | 8/2004 | Morcom |
| 2008/0309626 A1 | 12/2008 | Westerman et al. |
| 2010/0123665 A1 | 5/2010 | Birkler |
| 2011/0248941 A1 | 10/2011 | Abdo et al. |

FOREIGN PATENT DOCUMENTS

| | | |
|---|---|---|
| CN | 1573660 A | 2/2005 |
| CN | 101681234 A | 3/2010 |

OTHER PUBLICATIONS

Office Action dated Oct. 10, 2016 for Chinese Appln. No. 201210574786.9.
Andrew W. Fitzgibbon, Maurizio Pilu, Robert B. Fisher; Direct Least Squares Fitting of Ellipses; Department of Artificial Intelligence, The University of Edinburgh; Jan. 4, 1996; pp. 1-15.

*Primary Examiner* — Gerald Johnson
(74) *Attorney, Agent, or Firm* — Kevin E. West; Advent, LLP

(57) ABSTRACT

Techniques are described that may be implemented with an electronic device to detect a gesture within a field of view of a sensor and generate a compact data representation of the detected gesture. In implementations, a sensor is configured to detect a gesture and provide a signal in response thereto. An estimator, which is in communication with the sensor, is configured to generate an elliptical representation of the gesture. Multiple coefficients for the compact representation of the gesture can be used to define the ellipse representing the gesture.

16 Claims, 8 Drawing Sheets

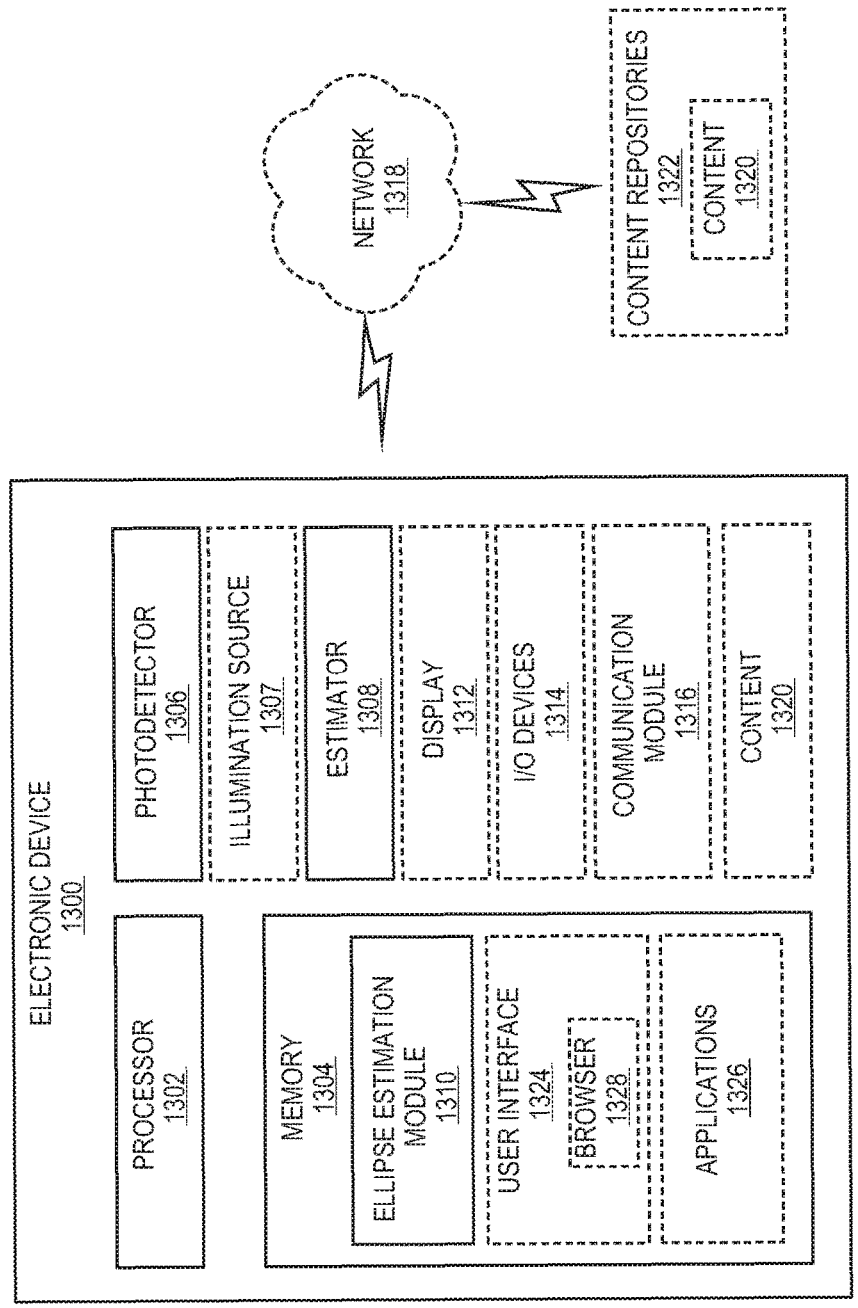

GESTURE DETECTION AND COMPACT REPRESENTATION THEREOF

CROSS-REFERENCE TO RELATED APPLICATIONS

The present application is a continuation under 35 U.S.C. § 120 of U.S. patent application Ser. No. 14/792,029, filed Jul. 6, 2015, and titled "GESTURE DETECTION AND COMPACT REPRESENTATION THEREOF" which is a continuation under 35 U.S.C. § 120 of U.S. patent application Ser. No. 13/337,733, filed Dec. 27, 2011, and titled "GESTURE DETECTION AND COMPACT REPRESENTATION THEREOF". U.S. patent application Ser. No. 14/792,029 and U.S. application Ser. No. 13/337,733 are herein incorporated by reference in their entireties.

BACKGROUND

Gesture detection and recognition can be used to provide new and more intuitive interfaces to electronic devices. The goal of gesture recognition is to interpret human gestures via mathematical algorithms. Generally speaking, gestures can originate from any bodily motion or state, but most often originate from the face or hand of a human user, e.g., in the manner of hand gestures. Gesture recognition is often looked to as a way for computers to begin to understand human body language, in order to provide a more convenient and/or intuitive interface between machines and humans than text-based interfaces and Graphical User Interfaces (GUIs), which typically limit the majority of electronic device input to a keyboard, a mouse, and possibly a touchpad. Thus, gesture detection and recognition can enable humans to interact more naturally with machines without requiring the use of mechanical input devices.

SUMMARY

Techniques are described that may be implemented with an electronic device to detect a gesture within a field of view of a sensor and generate a compact data representation of the detected gesture. In implementations, a sensor is configured to detect a gesture and provide a signal in response thereto. An estimator, which is in communication with the sensor, is configured to generate an elliptical representation of the gesture. Multiple coefficients for the compact representation of the gesture can be used to define the ellipse representing the gesture.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 13 is a block diagram illustrating an electronic device that can be configured to determine a compact representation of a gesture in accordance with example implementations of the present disclosure.

DETAILED DESCRIPTION

Overview

Figure 1:
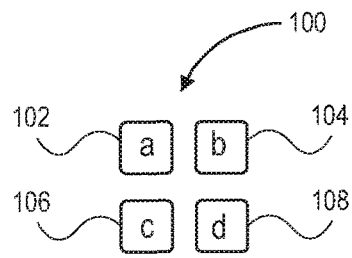
FIG. 1 is a diagrammatic illustration of four photodiodes arranged in a photodiode array in accordance with example implementations of the present disclosure.

Increasingly, gesture detection is being employed by electronic devices to detect input for various applications associated with the electronic device. However, such electronic devices typically employ a large number of photodetectors to improve range and operation (e.g., noise reduction) of gesture detection.

Accordingly, techniques are described that may be implemented with an electronic device to detect a gesture within a field of view of a sensor (e.g., a photodetector) and generate a compact data representation of the detected gesture. In implementations, a photodetector of an electronic device is configured to detect light corresponding to a gesture and provide a signal in response thereto. For example, the photodetector may comprise a segmented photodetector that includes an array of individual photodetectors (e.g., an array of two-by-two (2×2) photodetectors). An estimator, which is in communication with the sensor/photodetector, is configured to generate one or more estimated values of the signal corresponding to an elliptical representation of the gesture. For example, the estimator may be a Kalman estimator configured to estimate velocity vectors based upon the signals generated by the segmented photodetector.

Multiple coefficients associated with the estimated values can be determined based upon an elliptical representation of the gesture. These coefficients can then be used to represent the gesture. In an implementation, five (5) coefficients can be used to represent various characteristics of an ellipse. For example, representative coefficients may include the center coordinates (centroid) of the ellipse within a geographic plane, radii of the ellipse (e.g., a semi-major radius and a semi-minor radius) within the geographic plane, and an orientation of the ellipse within the geographic plane (e.g., an angular measurement with respect to an axis of the geographic plane). In implementations, the orientation of the ellipse can be used to represent the direction of the gesture with respect to the orientation of the photodetector, while the semi-major radius of the ellipse can be used to represent the speed/velocity of the gesture, and the area of the ellipse can be used to represent the size and height of the object.

Thus, the electronic device is configured to detect a gesture and determine a lossless and compact elliptical representation of the gesture (e.g., using five coefficients), allowing for greater gesture detection robustness. In implementations, a direct least squares fit of an ellipse can make full use of the measured gesture data, translating to an increase in the effective range of operation for a particular sensor size. Through the use of stochastic estimation techniques and least squared identification, gesture detection robustness can be increased, while false positives can be reduced. This stochastic estimation may provide compensation for imperfections in, for example, optical and/or electrical paths. This improved performance is manifested as an extended range of operation. Further, cost of equipment associated with gesture detection may be reduced, e.g., by reducing the area required for the associated detection equipment, such as photodiodes, while still maintaining adequate performance.

Example Techniques

Referring now to FIGS. 1 through 12, a sensor is described that is configured to sense a gesture and provide one or more electronic signals representing the gesture. For example, with reference to FIG. 1, a sensor may be implemented using a photodiode array 100 comprising a number of photodiodes (e.g., four photodiodes 102, 104, 106, and 108). However, it should be noted that photodiode array 100 is provided by way of example only and is not meant to be restrictive of the present disclosure. Thus, other sensors may be employed. For example, the photodiode array 100 may comprise a four by four (4×4) array of photodiodes, and so forth. In implementations, the photodiode array 100 may be implemented for gesture detection and/or recognition with a device such as a tablet computer, a mobile phone, a smart phone, a Personal Computer (PC), a laptop computer, a netbook computer, a hand-held portable computer, a Personal Digital Assistant (PDA), a multimedia device, a game device, an e-book reader device (eReader), a Smart TV device, a surface computing device (e.g., a table top computer), and so forth.

Figure 2:
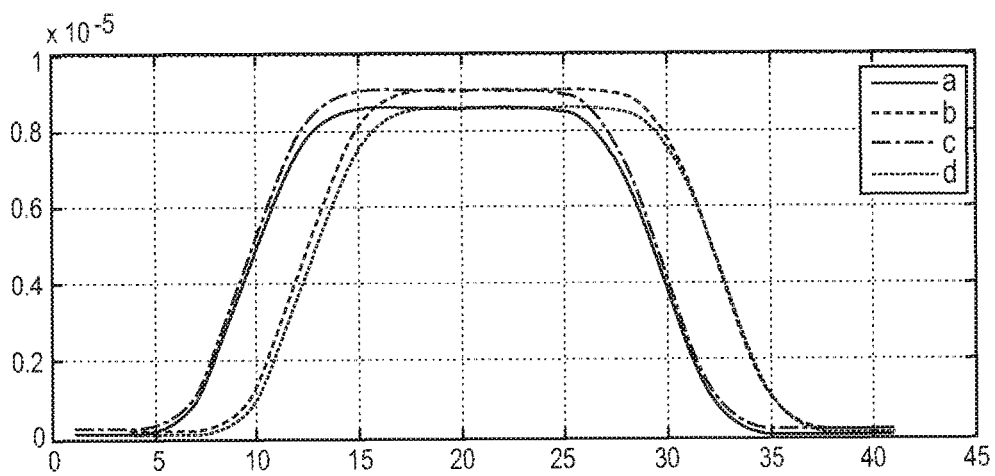
FIG. 2 is a graph illustrating the response of the four photodiodes shown in FIG. 1 when a left-to-right swipe gesture is detected by the photodiode array.
Figure 3:
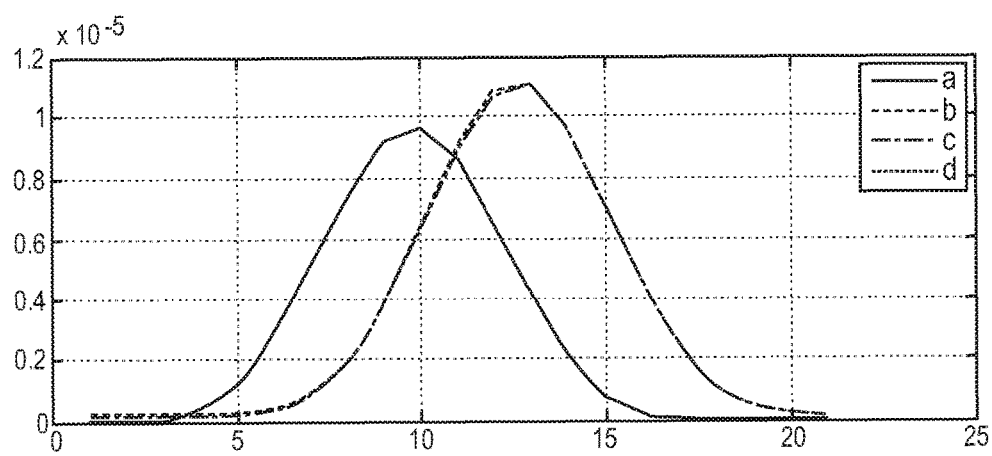
FIG. 3 is a graph illustrating the response of the four photodiodes shown in FIG. 1 when a top-to-bottom swipe gesture is detected by the photodiode array.

As an object (e.g., a hand) traverses the field of view of the photodiode array 100 from left to right, the generated array response may be represented by the graph shown in FIG. 2, where the pair of photodiodes 102 and 106 exhibit similar responses, as does the pair of photodiodes 104 and 108. In the context of the present example, these responses indicate that the object entered the field of view of the photodiode array 100 from the left and exited to the right (e.g., in the manner of a left-to-right swipe gesture). Similarly, as shown in FIG. 3, when an object enters the field of view of the photodiode array 100 from the top and exits at the bottom (e.g., in the manner of a top-to-bottom swipe gesture), the pair of photodiodes 102 and 108 may exhibit similar responses, as does the pair of photodiodes 102 and 104. One technique to determine the direction of the gesture would be to time stamp a zero-crossing or threshold, and then determine a direction based upon a single sample point (e.g., with reference to the zero-crossing/threshold). However, this technique is susceptible to noise.

Figure 4:
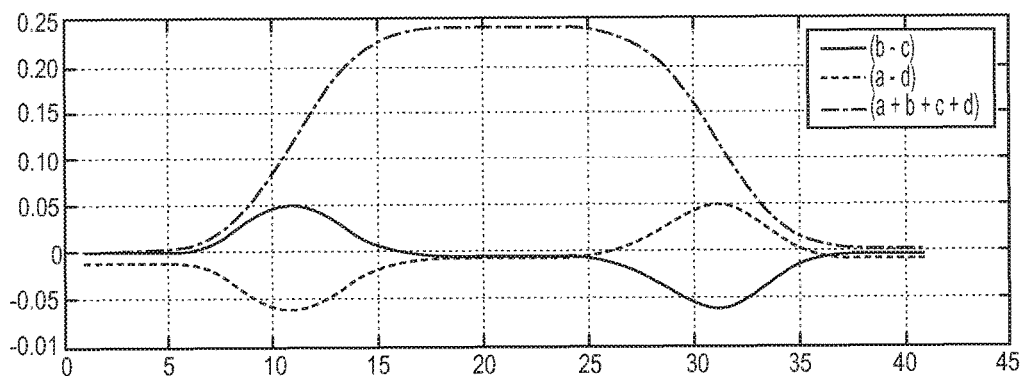
FIG. 4 is a graph illustrating differential responses for two pairs of the four photodiodes shown in FIG. 1, along with an absolute magnitude of the responses of the four photodiodes.

Referring now to FIG. 4, a differential response may be computed for the four photodiodes 102, 104, 106, and 108 of the photodiode array 100 for gesture recognition. For example, differential pairs may be defined such that the response of photodiode 104 minus the response of photodiode 106 is used to represent a Northeast-to-Southwest (NESW) gradient, where the cardinal directions North (N), South (S), East (E), and West (W) correspond to orientations with respect to the photodiode array 100 of top, bottom, right, and left, respectively. Similarly, the response of photodiode 102 minus photodiode 108 is used to represent a Northwest-to-Southeast (NWSE) directional gradient. Additionally, the response of the four photodiodes 102, 104, 106, and 108 can be summed to provide an absolute magnitude/depth for the photodiode array 100.

Figure 5:
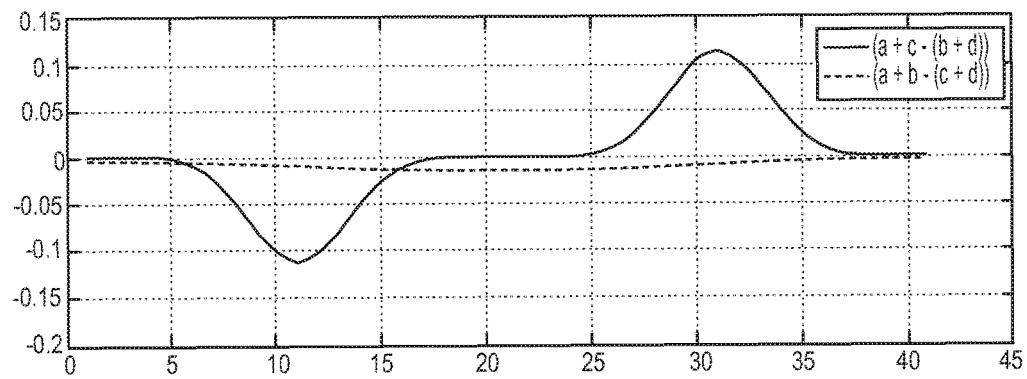
FIG. 5 is a graph illustrating a direct measurement of the response of the four photodiodes with respect to a Cartesian coordinate reference frame in accordance with example implementations of the present disclosure.

Referring to FIG. 5, differential pairs (e.g., as described above) can be combined to form a direct measurement within a Cartesian reference frame (e.g., using x and y coordinates). For instance, a coordinate system can be defined where an x-coordinate is determined based upon adding the response of photodiodes 102 and 106, and then subtracting the responses of photodiodes 104 and 108 from the resulting sum. Further, a y-coordinate can be determined based upon adding the responses of photodiodes 102 and 104 and subtracting the responses of photodiodes 106 and 108. The response of the photodiode array 100 calculated in this manner is shown in FIG. 5, where it can be seen that there is a clearly defined stimulus in the x-dimension and a slight stimulus in the y-dimension. This response implies a left-to-right gesture. It should be noted that a right-to-left gesture may be depicted in a similar manner, but with a change in sign.

In implementations, an elliptical representation of a gesture may be generated using a Kalman Estimator for velocity vector estimation and sensor calibration, and a direct form least squares estimation to fit the data to an ellipse. In the present example, the Kalman Estimator comprises seven states: x, dxdt, y, dydt, z, xoffset, and yoffset. In this example, (x,y) correspond to coordinates in the Cartesian reference frame derived above; (dxdt, dydt) are the dimensionless velocity vectors of the object within the reference frame; (z) corresponds to a magnitude vector, which is conceptually proportional to the depth/height/side of the object; and the (xoffset, yoffset) states track bias offset within the optical/electrical paths. For example, dust on the lens will manifest as a bias in the measurement of (z1,z2).

The present example uses the linear form of a Kalman Estimator. A similar Extended Kalman Estimator can be used with a polar coordinate system, and can provide estimations of phase information. The techniques described herein can be used with either form of a Kalman Estimator. For these states, the following equations are defined:

$$x(k+1)=A*x(k)+G*q$$

where A represents the state transition matrix, Q=G*v represents model variance, and $$A = \begin{bmatrix} a & T & 0 & 0 & 0 & 0 & 0 \\ 0 & 1 & 0 & 0 & 0 & 0 & 0 \\ 0 & 0 & a & T & 0 & 0 & 0 \\ 0 & 0 & 0 & 1 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{bmatrix}$$

$$Q = \begin{bmatrix} q & 0 & 0 & 0 & 0 & 0 & 0 \\ 0 & q & 0 & 0 & 0 & 0 & 0 \\ 0 & 0 & q & 0 & 0 & 0 & 0 \\ 0 & 0 & 0 & q & 0 & 0 & 0 \\ 0 & 0 & 0 & 0 & q & 0 & 0 \\ 0 & 0 & 0 & 0 & 0 & q & 0 \\ 0 & 0 & 0 & 0 & 0 & 0 & q \end{bmatrix}$$

For the measurements, the following measurement equation is defined:

$y(k) = H*x(k) + W*r$ where H is the measurement matrix, $R = W*rr'$ is the noise variance, and $$R = \begin{bmatrix} r & 0 & 0 \\ 0 & r & 0 \\ 0 & 0 & r \end{bmatrix}$$

$$H = \begin{bmatrix} -1 & 0 & 1 & 0 & 0 & 1 & 0 \\ 1 & 0 & 1 & 0 & 0 & 0 & 1 \\ 0 & 0 & 0 & 0 & 1 & 0 & 0 \end{bmatrix}$$

The Kalman Estimator code segment below iterates on each measurement and estimates the states:

```
for i=1:max(size(z))
    % a priori update
    x = A * x;
    P = A * P * A' + Q;
    % a postpripri update
    y = z(:,i) - H * x;
    K = P*H'*(H*P*H' + R)^-1;
    x = x + K * y;
    P = (eye(size(P)) - K*H)*P;
    output(i,:) = x(:);
    Z(:,i) = x(5);
end
```

Figure 6:
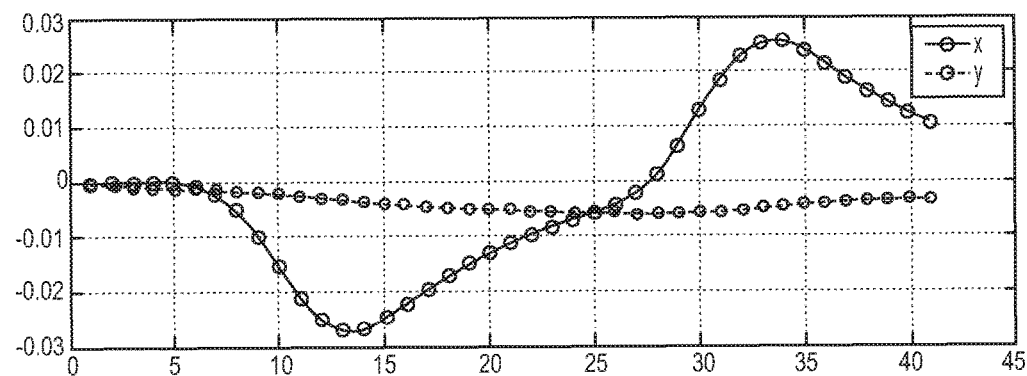
FIG. 6 is a graph illustrating estimated position states for the photodiode response illustrated in FIG. 5.
Figure 7:
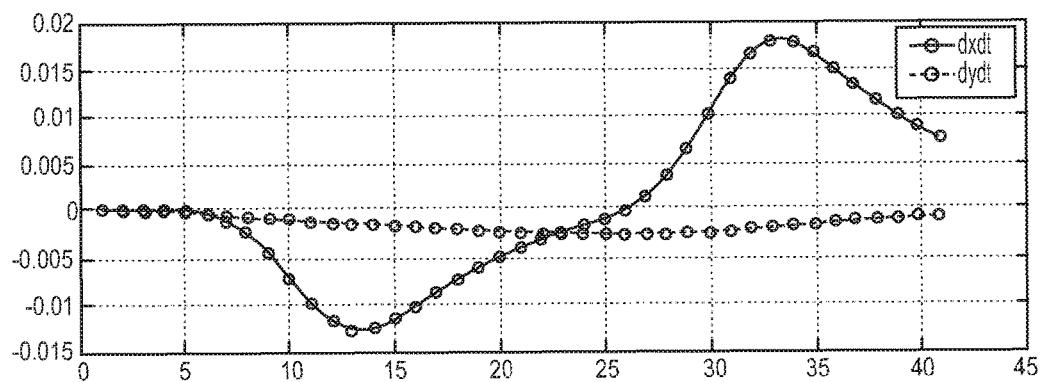
FIG. 7 is a graph illustrating Kalman Estimator derived velocity vectors/pseudo velocity states for the photodiode response illustrated in FIG. 5.
Figure 8:
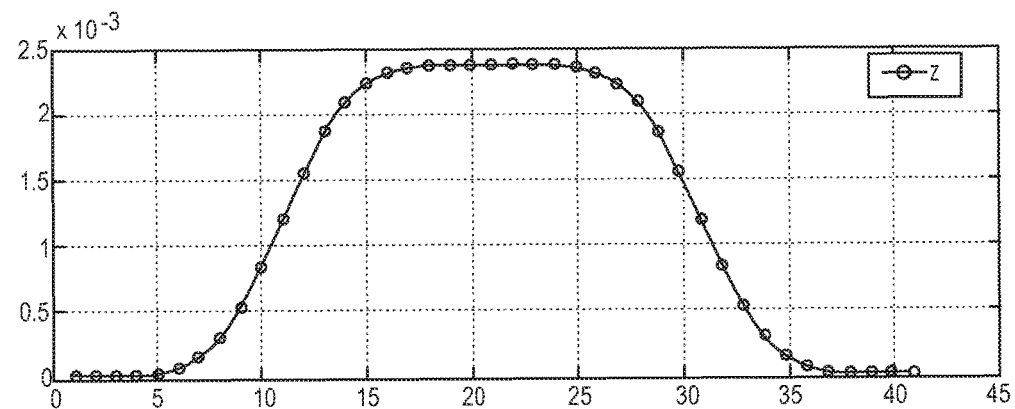
FIG. 8 is a graph illustrating estimated depth state for the photodiode response illustrated in FIG. 5.
Figure 9:
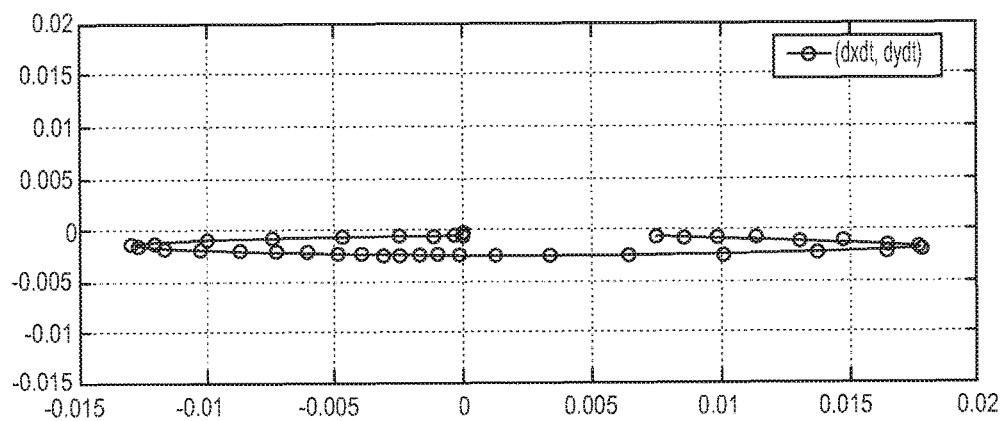
FIG. 9 is a graph illustrating dxdt plotted against dydt for a left-to-right horizontal swipe gesture in accordance with example implementations of the present disclosure.
Figure 10:
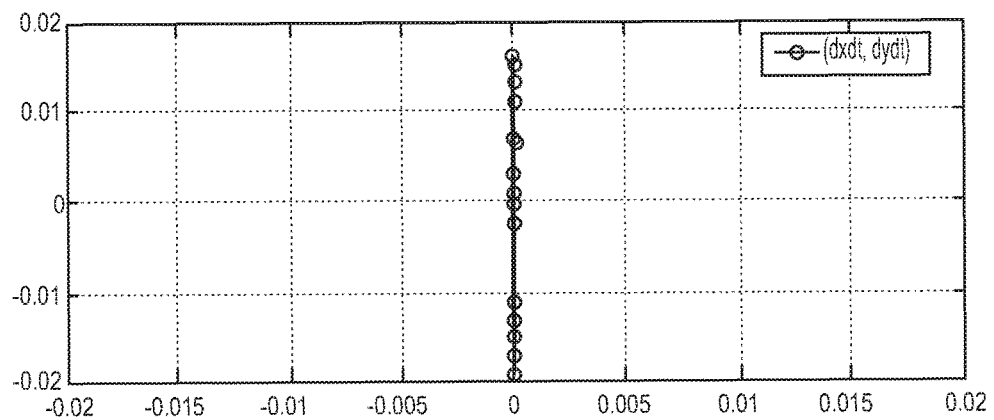
FIG. 10 is a graph illustrating dxdt plotted against dydt for a top-to-bottom vertical swipe gesture in accordance with example implementations of the present disclosure.
Figure 11:
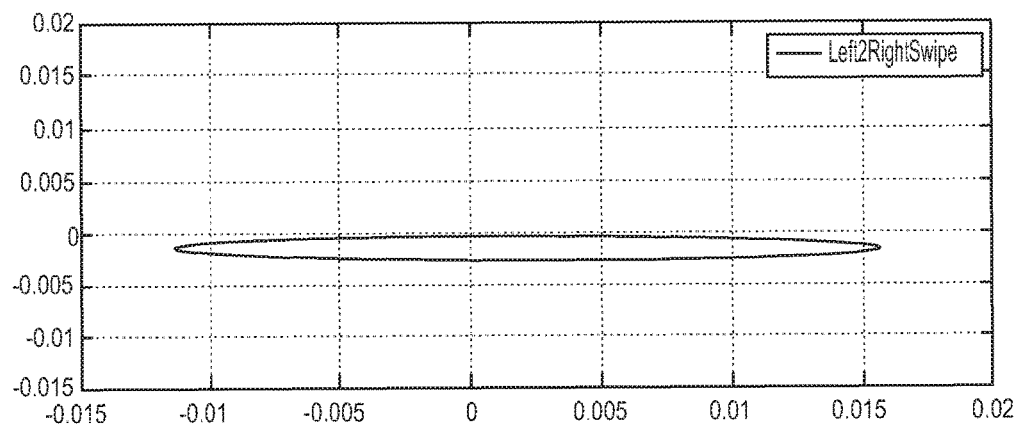
FIG. 11 is a graph of an elliptical representation of the left-to-right horizontal swipe illustrated in FIG. 9.
Figure 12:
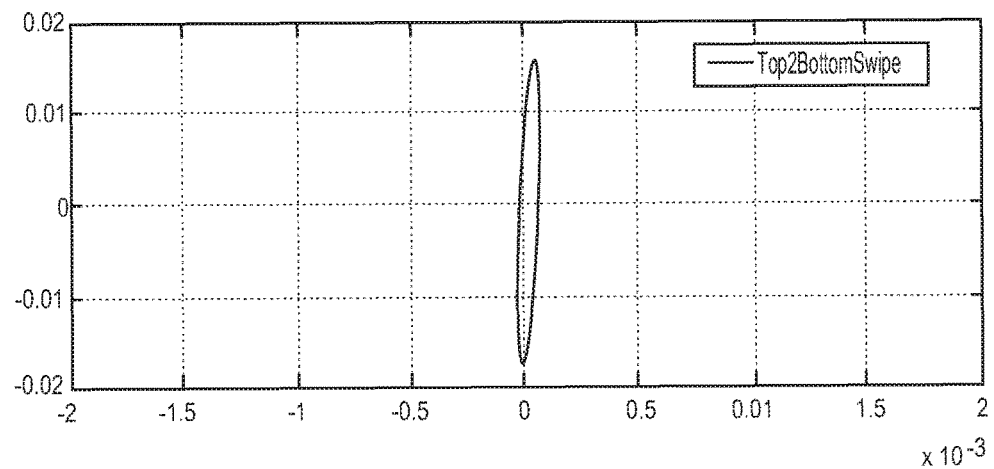
FIG. 12 is a graph of an elliptical representation of the top-to-bottom vertical swipe illustrated in FIG. 10.
Figures 14A, 14B:
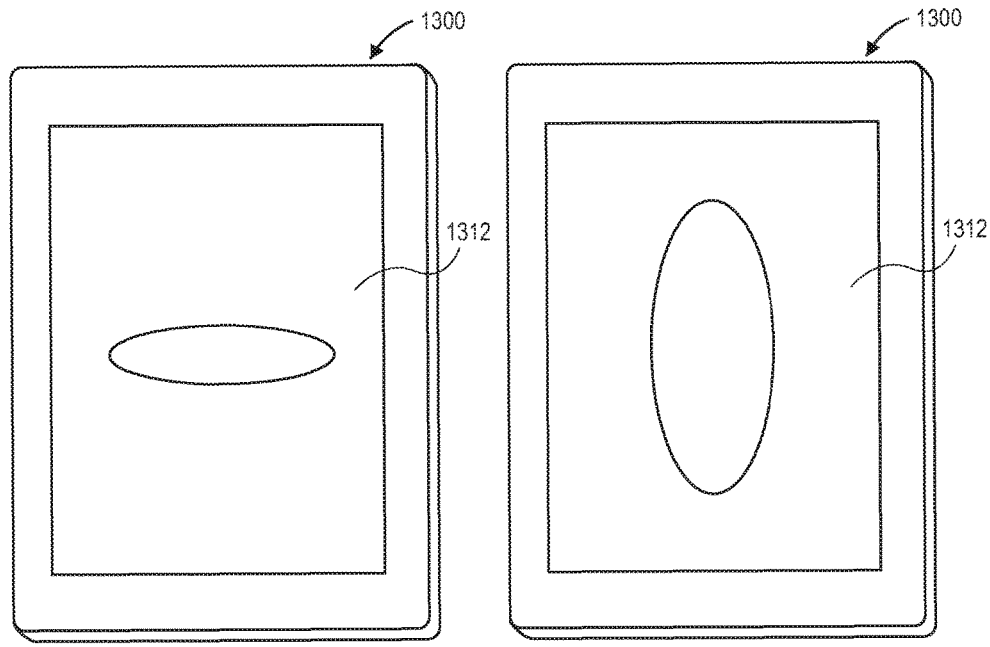
FIGS. 14A through 14D are diagrammatic illustrations of the electronic device illustrated in FIG. 13, wherein the electronic device is configured to provide a visual representation of the compact representation of a gesture via a display.
Figures 14C, 14D:
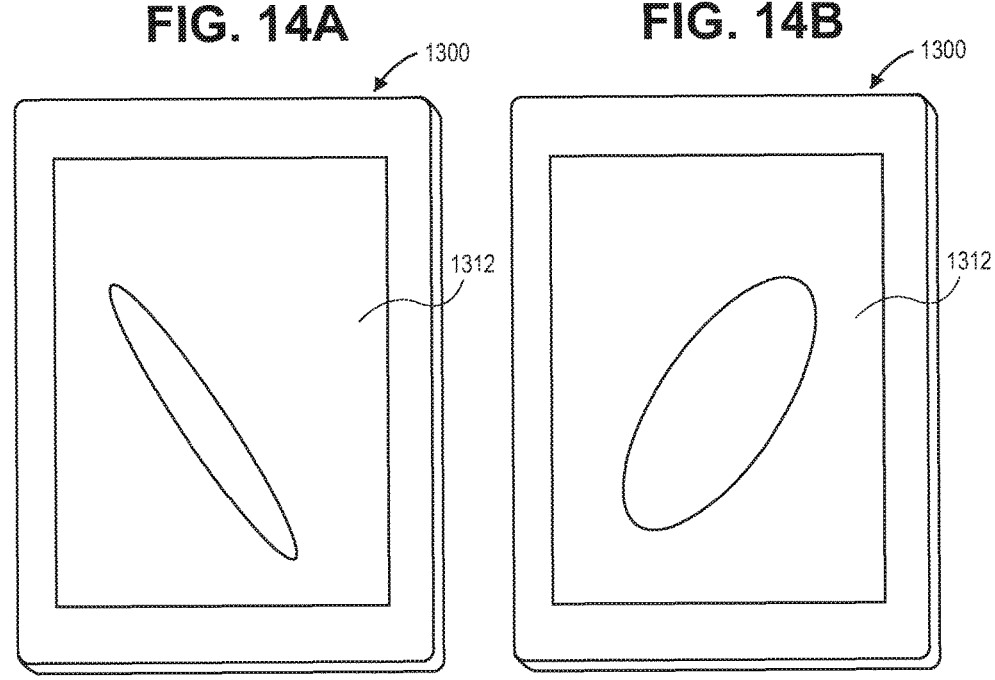

Referring now to FIG. 6, position states (x,y) are shown that correspond to filtered measurements shown in FIG. 5. It should be noted that the filter bandwidth is derived from the error covariance and measurement parameters, which depend on the noise characteristics of, for instance, photodiodes 102, 104, 106, and 108. Referring to FIG. 7, estimated pseudo velocity states (dxdt,dydt) are depicted. In FIG. 8, estimated depth is depicted. Referring now to FIGS. 9 and 10, it can be seen that dxdt plotted against dydt is elliptical in nature. FIG. 9 depicts this for a left-to-right swipe gesture, and FIG. 10 depicts this for a top-to-bottom swipe gesture. It can be seen that the orientation of the gesture is implicit in this representation. Elliptical representations of the gestures of FIGS. 9 and 10 are shown in FIGS. 11 and 12, respectively. In some implementations, when the number of samples between two extremities of an elliptical representation small (e.g., less than four (4)), the gesture may be deemed invalid/undefined. However, the number four (4) is provided by way of example only and is not meant to be restrictive of the present disclosure. Thus, other numbers of samples may be required to detect a valid gesture.

In the following discussion, an example electronic device is described. Example procedures are then described that may be employed by the device.

Example Environment

FIG. 13 illustrates an example electronic device 1300 that is operable to perform techniques discussed herein. The electronic device 1300 may be configured in a variety of ways. For instance, electronic device 1300 may be configured as a tablet computer, a mobile phone, a smart phone, a PC, a laptop computer, a netbook computer, a hand-held portable computer, a PDA, a multimedia device, a game device, an eReader device, a Smart TV device, a surface computing device (e.g., a table top computer), a Human Interface Device (HID), combinations thereof, and so forth. However, these devices are provided by way of example only and are not meant to be restrictive of the present disclosure. Thus, the electronic device 1300 may be configured as various other devices, which may include a hands-free human interface.

In FIG. 13, the electronic device 1300 is illustrated as including a processor 1302 and a memory 1304. The processor 1302 provides processing functionality for the electronic device 1300 and may include any number of processors, micro-controllers, or other processing systems and resident or external memory for storing data and other information accessed or generated by the electronic device 1300. The processor 1302 may execute one or more software programs which implement the techniques and modules described herein. The processor 1302 is not limited by the materials from which it is formed or the processing mechanisms employed therein and, as such, may be implemented via semiconductor(s) and/or transistors (e.g., electronic Integrated Circuits (ICs)), and so forth.

The memory 1304 is an example of device-readable storage media that provides storage functionality to store various data associated with the operation of the electronic device 1300, such as the software program and code segments mentioned above, or other data to instruct the processor 1302 and other elements of the electronic device 1300 to perform the techniques described herein. Although a single memory 1304 is shown, a wide variety of types and combinations of memory may be employed. The memory 1304 may be integral with the processor 1302, stand-alone memory, or a combination of both. The memory may include, for example, removable and non-removable memory elements such as Random Access Memory (RAM), Read Only Memory (ROM), Flash memory (e.g., a Secure Digital (SD) card, a mini-SD card, a micro-SD card), magnetic memory, optical memory, Universal Serial Bus (USB) memory devices, and so forth. In embodiments of the electronic device 1300, the memory 1304 may include removable Integrated Circuit Card (ICC) memory, such as memory provided by Subscriber Identity Module (SIM) cards, Universal Subscriber Identity Module (USIM) cards, Universal Integrated Circuit Cards (UICC), and so on.

As shown in FIG. 13, the electronic device 1300 includes a sensor, such as a photosensor/photodetector 1306 (e.g., an Ambient Light Sensor (ALS)). The photodetector 1306 may be configured in a variety of ways. For example, the photodetector 1306 may comprise one or more photosensor diodes, phototransistors, and so forth (e.g., as described with reference to FIG. 1). In implementations, the photodetector 1306 is capable of detecting light and providing a signal in response thereto. Thus, the photodetector 1306 may provide a signal by converting light into current and/or voltage based upon the intensity of the detected light. For example, when photodetector 1306 is exposed to light, multiple free electrons may be generated to create a signal comprised of electrical current. The signal may correspond to one or more characteristics of the detected light. For example, the characteristics may correspond to, but are not necessarily limited to: the position of the detected light with respect to the photodetector 1306, the intensity (e.g., irradiance, etc.) of the light incident upon the photodetector 1306, how long the light is incident on the photodetector 1306, an orientation of the light incident upon the photodetector 1306, and so forth.

The photodetector 1306 can be configured to detect light in both the visible light spectrum and the near infrared light spectrum. As used herein, the term "light" is used to refer to electromagnetic radiation occurring in the visible light spectrum and/or the near infrared light spectrum. For instance, as referenced herein, the visible light spectrum (visible light) includes electromagnetic radiation occurring in the range of wavelengths from about three hundred ninety nanometers (390 nm) to approximately seven hundred fifty nanometers (750 nm). Similarly, as referenced herein, the near infrared light spectrum (infrared light) includes electromagnetic radiation that ranges in wavelength from about seven hundred nanometers (700 nm) to three microns (3 μm). In implementations, Complementary Metal-Oxide-Semiconductor (CMOS) fabrication techniques may be used to form the photodetector 1306.

In implementations, the photodetector 1306 comprises an ALS configured as a segmented photodetector 1306. The segmented photodetector 1306 may include an array of individual photodetectors provided in a single package. For example, a quad segmented photodetector can be used that is functionally equivalent to four (4) individual photodetectors arranged in a quad (e.g., two-by-two (2×2)) layout array. Thus, the photodetector 1306 may be configured to detect gestures in multiple orientations with respect to the orientation of the photodetector 1306 (e.g., right-to-left, left-to-right, top-to-bottom, bottom-to-top, diagonally across the photodetector, etc.). For example, as an object (e.g., a hand) passes through the field of view of the segmented photodetector 1306, each individual photodetector may provide a signal that is out of phase with the other photodetectors of the segmented photodetector 1306 as the object passes over the respective individual photodetectors.

While photodetector 1306 has been described with some specificity as comprising a number of photodiodes arranged in an array (e.g., as shown in FIG. 13) and/or as a segmented photodetector 1306, these configurations are provided by way of example only and are not meant to be restrictive of the present disclosure. Thus, the photodetector 1306 may include, but is not necessarily limited to: an active pixel sensor (e.g., an image sensor including an array of pixel sensors, where each pixel sensor is comprised of a light sensor and an active amplifier); a Charge-Coupled Device (CCD); a Light-Emitting Diodes (LED) reverse-biased to act as a photodiode; an optical detector that responds to the heating effect of incoming radiation, such as a pyroelectric detector, a Golay cell, a thermocouple, and/or a thermistor; a photoresistor/Light Dependent Resistor (LDR); a photovoltaic cell; a photodiode (e.g., operating in photovoltaic mode or photoconductive mode); a photomultiplier tube; a phototube; a phototransistor; and so forth. Further, photodetector 1306 is provided by way of example only and other sensors can be used to detect gestural motions, including a proximity sensor that emits a beam of electromagnetic radiation (e.g., infrared light), a touchpad, a camera, and so forth. For instance, one or more cameras can be used to detect gestures, such as depth-aware cameras, stereo cameras, and so forth.

The electronic device 1300 may include an illumination source 1307 configured to generate light (e.g., near infrared light and/or visible light) within a limited spectrum of wavelengths. The illumination source 1307 may be used to illuminate an object proximal to the electronic device 1300, such as the hand of an operator, allowing the photodetector 1306 to more easily and/or accurately detect the object. In an implementation, the photodetector 1306 may be configured to detect light (e.g., light reflected from an object proximate to the device 1300) generated and emitted from the illumination source 1307. Thus, the photodetector 1306 may be configured to detect light within a limited spectrum of wavelengths. For example, the illumination source 1307 may generate a light occurring in a first spectrum of wavelengths, and the photodetector 1306 may be configured to detect light only occurring within the first spectrum of wavelengths. In implementations, the illumination source 1307 may comprise a light emitting diode, a laser diode, or another type of light source.

As shown in FIG. 13, the electronic device 1300 includes an estimator 1308 configured to provide estimated values based upon the signals received from the photodetector 1306 (e.g., via a data bus, or the like). In an implementation, the estimated values correspond to characteristics of the detected light (e.g., positional data of the detected light within the photodetector 1306 field of view, the intensity of the light incident upon the photodetector 1306 for deriving depth data relating to the object within the field of view, the orientation of the light incident upon the photodetector 1306 for deriving directional data relating to the object, the time for which light was incident upon the photodetector 1306 for deriving velocity data relating to the object, etc.) For example, the estimator 1308 is configured to receive signals representing characteristics of the light detected by the photodetector 1306 (e.g., the segmented photodetector 1306) and produce estimated values based upon these characteristics. The estimator 1308 may be implemented in hardware, software, firmware, combinations thereof, or the like.

The estimator 1308 may use any suitable stochastic technique to derive the estimated values. For example, the estimator 1308 may be a Kalman estimator, or the like. In a specific example, the estimator 1308 may be a Kalman estimator configured to generate linear coordinate information representing the detected light. For example, the estimator 1308 may be configured to derive estimated values, such as velocity estimates (e.g., velocity vectors), of the measured values of the signals and/or calculated values associated with the signals by predicting an estimated value corresponding to characteristics of the light (e.g., as measured by the photodetector 1306), estimating the uncertainty of the predicted estimated value, and computing a weighted average of a predicted estimated value and a measured value. In an implementation, the estimator 1308 may derive velocity vectors as a function of the amount of time light is incident upon the photodetector 1306.

The estimator 1308 may also determine the direction of a gesture based upon which individual photodetecting elements of the photodetector 1306 receive reflected light for a given amount of time. For example, a first photodetecting element within a segmented photodetector 1306 may detect light reflected from a gesture before a second photodetecting element detects the light, e.g., as an object is moved within the field of view of the segmented photodetector 1306. Thus, the estimator 1308 may be configured to generate velocity vectors for a detected object based upon positional changes of detected light within a field of view of the photodetector 1306 as a function of time (e.g., as function of the capture rate of the photodetector 1306). In another specific example, the estimator 1308 may be a Kalman estimator configured to derive polar coordinate information of the detected light (e.g., deriving phase information of the detected light, etc.).

While the device 1300 is operational, the estimator 1308 can be configured to continuously sample signals from the photodetector 1306. For instance, the estimator 1308 may be configured to continuously sample signals generated by the photodetector 1306 at or during predetermined time intervals (e.g., sampling about every microsecond, about every millisecond, about every second, etc.). Further, the estimator 1308 may be configured to account for biases and/or offsets within signals received from the photodetector 1306. For instance, the estimator 1308 may be configured to account for an obscurity (e.g., a liquid drop, a dust particle, etc.) within the field of view of the photodetector 1306 and generate estimated values (e.g., velocity estimates) corresponding to characteristics of the light incident upon the photodetector 1306 while compensating for the obscurity with respect to the detected light characteristics. For example, the estimator 1308 may derive offset information pertaining to detected light.

As shown in FIG. 13, the electronic device 1300 may include an ellipse estimation module 1310 in communication with the estimator 1308 (e.g., via a data bus, etc.). The ellipse estimation module 1310 represents functionality to generate coefficients that correspond to (e.g., represent) the estimated values generated by the estimator 1308. For example, five (5) coefficients can be generated for an elliptical representation of a gesture direction and a gesture magnitude, as measured with respect to a geographic plane. For instance, the elliptical representation may be a description of a ellipse in a general parametric representation, a canonical representation, a polar representation, or the like. In implementations, the ellipse estimation module 1310 is configured to generate coefficients relating to the detected gesture (e.g., a finger swipe, etc.) based upon velocity vectors generated by the estimator 1308. The ellipse estimation module 1310 may use a suitable ellipse estimation model to derive a coefficient dataset, such as a Least Squares model, and so forth. For example, the ellipse estimation module 1310 may use the Least Squares model as described in "Direct Least Squares Fitting of Ellipses" (Fitzgibbon, Andrew W.; Pilu, Maurizio; & Fisher, Robert B. (1999). Direct Least Square Fitting of Ellipses. *IEEE Transactions on Pattern Analysis and Machine Intelligence,* 21(5): 476-480.), which is herein incorporated by reference in its entirety. In implementations, the ellipse estimation module 1310 uses the Least Squares model to generate five (5) coefficients, as described herein.

In a specific instance, the coefficients derived using a Least Squares model, may comprise a general parametric representation of an ellipse, with two (2) center coefficients that represent the center coordinates of the ellipse within a geographic (e.g., Cartesian) plane (where the center coefficients are denoted herein as Cx, Cy), two (2) radii coefficients that represent radii values (e.g., semi-major and semi-minor radii) of the ellipse within the geographic plane (denoted herein as Rx, Ry), and one (1) coefficient that represents the orientation (e.g., angle) of the ellipse within the geographic plane (denoted herein as theta). Thus, the coordinate system embodies a reference frame for the geometrical representation of the gesture, and the orientation and speed of the gesture are represented with respect to this reference frame. It should be noted that the geographic plane used to map the generated ellipse may correlate to spatial positions of the gesturer with respect to the photodetector 1306. For example, center coefficients for ellipses representing spatially separated gestures may be separated by a finite distance within the coordinate system, where the distance between the center coefficients corresponds to a spatial distance between the gestures provided by the gesturer with respect to, for example, photodetector 1306. While this example has been provided with reference to a general parametric representation, it should be noted that other elliptical representations may be used as well, including, but not necessarily limited to: a canonical representation and a polar representation.

In implementations, the theta coefficient corresponds to the direction of the detected gesture with respect to the orientation of the photodetector 1306 (e.g., comprising an angle representing left-to-right, right-to-left, up-to-down, down-to-up, or diagonal orientations of the gesture, etc.). In implementations, one or more of the radii values may correspond to a velocity of the detected gesture. For instance, the longer the light is incident upon the photodetector 1306, the smaller a radii value may be, as compared to a radii value associated with a shorter amount of time that light is incident upon the photodetector 1306 (e.g., for a slower gesture performed over the photodetector 1306 versus a quicker gesture performed over the photodetector 1306).

The electronic device 1300 may be configured to interpret estimated values of a gesture based upon an analysis of two or more gestures. For example, once the device 1300 is transitioned from a non-operational state to an operational state, when a different user begins to operate the electronic device, and so forth, the device 1300 may request a baseline gesture to more accurately interpret relative velocity values for subsequently performed gestures. For example, the electronic device 1300 may initiate a request for a user to perform a gesture at an intermediate speed (e.g., between what would be a fast speed and slow speed for that particular user). Thus, a detected gesture that is quicker (e.g., where less light is incident upon the photodetector 1306) than the baseline may be represented using radii coefficients that are greater than radii coefficients used to represent a baseline gesture. Conversely, a detected gesture that is slower (e.g., where a greater amount of light is incident upon the photodetector 1306) than the baseline may be represented using radii coefficients that are less than baseline radii coefficients for that user. Further, the electronic device 1300 may store baseline gesture information in the form of coefficients (e.g., using memory 1304, and so forth) in order to interpret subsequently detected gestures for a particular user.

The device 1300 may be configured to distinguish between distinct gestures. For the purposes of the present disclosure, a distinct gesture may be defined as occurring when some amount of measurable light incident upon the photodetector 1306 transitions to at least substantially less measurable light incident upon the photodetector 106. In some instances (e.g., where light reflected by an object is used to measure a gesture), a transition from less detected light to substantially more detected light and again to less detected light may comprise a distinct gesture. In other instances (e.g., where light blocked by an object is used to measure a gesture, such as for a backlit object), a transition from more detected light to substantially less detected light and again to more detected light may comprise a distinct gesture. For example, the photodetector 1306 may be configured to generate signals corresponding to characteristics of the light (e.g., light emitted from the illumination source 1307) incident upon the photodetector 1306. Thus, once the photodetector 1306 is no longer is providing signals for a predetermined amount of time (e.g., a nanosecond, a millisecond, a second, and so forth), the ellipse estimation module 1310 may determine that the associated gesture has been completed and generate the coefficients corresponding to the signals representing the distinct gesture.

It should be noted that, for the purposes of the present disclosure, the term "light," when used with "detect," "sense," "convert," and so forth, should not be construed as limited to the detection or conversion of the presence or absence of light (e.g., above or below a particular threshold), or to detecting or converting a spectrum of wavelengths to a single measurement representative of overall light intensity (e.g., irradiance) within the spectrum. Thus, the detection and/or conversion of the presence of light, within the context of the present disclosure, may be used to refer to detecting and/or converting the presence or absence of light (e.g., above or below a particular threshold), detecting and/or converting a spectrum of wavelengths to a single measurement representative of overall light intensity within the spectrum, as well as to detecting and/or converting multiple frequencies within a range of possible frequencies, such as detecting and/or converting intensities of radiation separately in two or more subsets of wavelengths within a spectrum, as well as for individual frequencies, such as colors of light, and so forth.

Accordingly, phrases such as "more detected light" and "less detected light" may refer to both representations of light within a broad range of wavelengths and representations of light within a limited range of wavelengths (e.g., for a particular color within a color spectrum, etc.). For example, the phrase "a transition from more detected light to substantially less detected light and again to more detected light" may be used to refer to measurements of light within a spectrum of wavelengths (e.g., for visible light), as well as to measurements of light at one or more specific wavelengths and/or within multiple wavelength ranges (e.g., for a particular color). Thus, techniques described with reference to an array of photodiodes may also be applied with an image capture device (e.g., a camera), where an object (e.g., a hand) may be detected by differentiating its color from a different color indicative of the surrounding environment.

The electronic device 1300 includes a display 1312 to display information to a user of the electronic device 1300. In embodiments, the display 1312 may comprise an LCD (Liquid Crystal Diode) display, a TFT (Thin Film Transistor) LCD display, an LEP (Light Emitting Polymer) or PLED (Polymer Light Emitting Diode) display, an Organic Light Emitting Diode (OLED) display, and so forth, which may be configured to display text and/or graphical information, such as a graphical user interface, and so forth. The electronic device 1300 may further include one or more Input/Output (I/O) devices 1314 (e.g., a keypad, buttons, a wireless input device, a thumbwheel input device, a trackstick input device, and so on). In an implementation, the photodetector 1306 may be configured as an I/O device 1314. For example, the photodetector 1306 may detect light representing gestures corresponding to a desired operation associated with the electronic device 1300. Additionally, the I/O devices 1314 may comprise one or more audio I/O devices, such as a microphone, speakers, and so on.

The electronic device 1300 may include a communication module 1316, representative of communication functionality to permit electronic device 1300 to send/receive data between different devices (e.g., components/peripherals) and/or over one or more networks 1318. Communication module 1316 may be representative of a variety of communication components and functionality including, but not necessarily limited to: an antenna; a browser; a transmitter and/or a receiver; a wireless radio; a data port; a software interface and/or a driver; a networking interface; a data processing component; and so forth. The one or more networks 1318 are representative of a variety of different communication pathways and network connections which may be employed, individually or in combination, to communicate among the components of the environment 1300. Thus, the one or more networks 1318 may be representative of communication pathways achieved using a single network or multiple networks. Further, the one or more networks 1318 are representative of a variety of different types of networks and connections that are contemplated, including, but not necessarily limited to: the Internet; an intranet; a satellite network; a cellular network; a mobile data network; wired and/or wireless connections; and so forth.

Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; a 3G network; a 4G network; and so on. Wired communications are also contemplated such as through USB, Ethernet, serial connections, and so forth. The electronic device 1300, through functionality represented by the communication module 1316, may be configured to communicate via one or more networks 1318 to receive various content 1320 from one or more content repositories 1322 (e.g., an Internet provider, a cellular data provider, etc.). Content 1320 may represent a variety of different content, examples of which include, but are not necessarily limited to: web pages; services, music, photographs, video, email service, instant messaging, device drivers, instruction updates, and so forth.

The electronic device 1300 may include a user interface 1324, which is storable in memory 1304 and executable by the processor 1302. The user interface 1324 is representative of functionality to control the display of information and data to the user of the electronic device 1300 via the display 1312. In some implementations, the display 1312 may not be included as a part of the electronic device 1300 and may instead be connected externally using USB, Ethernet, serial connections, and so forth. The user interface 1324 may provide functionality to allow the user to interact with one or more applications 1326 of the electronic device 1300 by providing inputs via the I/O devices 1314. For example, the user interface 1324 may cause an Application Programming Interface (API) to be generated to expose functionality to an application 1326 to configure the application for display by the display 1312, or in combination with another display. In embodiments, the API may further expose functionality to configure the application 1326 to allow a user to interact with an application by providing inputs via the I/O devices 1314. For example, a user may provide hand gestures proximate to the photodetector 1306 corresponding to a desired operation associated with an application 1326. For instance, a user may perform a finger swipe proximate to the photodetector 1306 to transition between various display pages showing various applications 1326 within the display 1312.

The electronic device 1300 may include applications 1326, which may comprise software storable in memory 1304 and executable by the processor 1302, e.g., to perform a specific operation or group of operations to furnish functionality to the electronic device 1300. Example applications include cellular telephone applications, instant messaging applications, email applications, gaming applications, address book applications, and so forth. In implementations, the user interface 1324 may include a browser 1328. The browser 1328 enables the electronic device 1300 to display and interact with content 1320, such as a webpage within the World Wide Web, a webpage provided by a web server in a private network, and so forth. The browser 1328 may be configured in a variety of ways. For example, the browser 1328 may be configured as an application 1326 accessed by the user interface 1324. The browser 1328 may be a web browser suitable for use by a full resource device with substantial memory and processor resources (e.g., a smart phone, a PDA, etc.). The browser 1328 may be a mobile browser suitable for use by a low-resource device with limited memory and/or processing resources (e.g., a mobile telephone, a portable music device, a transportable entertainment device, etc.).

The electronic device 1300 is configured to detect gestures via the photodetector 1306 and generate a compact representation of the detected gestures. As described above, the estimator 1308 is configured to generate estimated values relating to the light incident upon the photodetector 1306. The estimated values are generated based upon the characteristics of the detected light. Thus, the estimated values may depend upon the intensity of light incident upon the photodetector 1306, the amount of time the light is incident upon the photodetector 1306, an orientation (e.g., direction) of the light incident upon the photodetector 1306, and so forth. In implementations, the ellipse estimation module 1310 receives the estimated values, such as the velocity values, from the estimator 1308 and generates the five (5) coefficients (Cx, Cy, Rx, Ry, theta) based upon the estimated values. The five coefficients may be used to form an ellipse in a geographic plane to represent the detected gesture. In implementations, the semi-major radius of the ellipse is proportional to the speed/dimensionless velocity vector of the gesture (which can be measured with respect to a baseline gesture), and the orientation of the ellipse corresponds to the direction of the gesture (e.g., with respect to the orientation of the photodetector 1306). Further, the area of the ellipse may convey the size (e.g., height) of an object performing the gesture.

In implementations, an elliptical representation of a gesture can be described (e.g., stored, transmitted, interpreted, and so forth) in a variety of ways. For example, an elliptical representation can be described using coefficients to represent a mathematical definition of the ellipse (e.g., as previously described). Further, an elliptical representation can be described as an image (e.g., a bitmap, etc.). In still further implementations, an elliptical representation of a gesture can be described using magnitude and angle measures (e.g., pseudo velocity and degrees notation, respectively). For example, a slow left-to-right gesture can be denoted as [097,0.1], while a faster right to left gesture may be denoted as [271,0.4] (where degree measurements are described in compass rose notation). It should be noted that a discrete event interface (e.g., where a right-to-left gesture is denoted as a text string, like "Right2Left," a left-to-right gesture is denoted as "Left2Right," and so forth) may be provided within the context of a gaming interface.

In implementations, the elliptical representation of a gesture (e.g., an image of an elliptical representation, coefficients defining an elliptical representation, magnitude and angle information derived from an elliptical representation, a string of text, and so forth) comprises an intermediate representation of a gesture and may be used to derive one or more discrete events, including, but not necessarily limited to: a left-to-right swipe, a right-to-left swipe, a top-to-bottom swipe, a bottom-to-top swipe, a stop-pause-select motion, a two-finger pinch, a two-finger zoom, a two-finger rotate, and so forth. In implementations, the elliptical representation may be used by the electronic device 1300 in various applications. For example, an ellipse and/or the coefficients of the ellipse may be used as input commands to the electronic device 1300 and/or to another device connected to the electronic device 1300 (e.g., when the electronic device 1300 is implemented as an interface device). For example, an elliptical representation having a small magnitude (e.g., with reference to a baseline gesture having a larger magnitude) may be used to define a zoom command.

A user may transition through an electronic book (e.g., perform finger swipes to "turn" the pages of the electronic book) displayed within the display 1312. In another implementation, the coefficients may be provided as parameters for an application 1326. For example, the coefficients may represent a desired action within a gaming sequence. For instance, the coefficients may be provided to a gaming application 1326, such as a golfing game, and the coefficients can represent the power and orientation of an input to the gaming application 1326 (e.g., the coefficients can represent the power and orientation of a golf swing within the golfing game). Additionally, the coefficients may be used as parameters to operate the user interface 1324. Further, the coefficients may be used by the electronic device 1300 within multiple applications that require input commands from a user. For example, an operating system or application may respond to a discrete command derived from an elliptical representation of a gesture by advancing a display at a rate proportional to a derived speed, a derived velocity vector, or a derived linear (e.g., horizontal or vertical) component vector derived from a velocity vector.

Using this type of approach, a user may navigate (e.g., flick) through menus controlling speed, direction, and/or selection. For example, a user may navigate through a cascading series of graphical representations of cover-flow artwork with quick right-to-left swipes followed by slower right-to-left swipes as the user gets closer to a desired track. Then, a stop-pause-select event may be used to complete a selection. A bottom-to-top swipe may constitute a cancel event. The ability to provide compact and lossless representations of such gestures can provide an intuitive and touch-free user interface. In another example implementation, left-to-right swipes can be used to change channels on a smart TV, while a top-to-bottom swipe can be used to lower the volume of the TV. This type of interface can be implemented using, for example, a photodetector 1306 positioned in the bezel of a TV frame, and may supplement or replace the buttons that would otherwise be provided for enabling control of the TV functions. In a further example, horizontal and/or vertical swipes can be used to advance the pages of a buttonless eReader.

As shown in FIGS. 14A through 14D, the electronic device 1300 may be configured to render a display of an ellipse representing a gesture as visual feedback to allow a user to visualize and/or refine the user's gesture. In an implementation, the ellipse estimation module 1310 is configured to provide instructions to the display 1312 to display the generated ellipse (and possibly subsequently generated ellipses) based upon a user's input gestures. Thus, the ellipse estimation module 1310 can generate the five coefficients based upon a gesture performed within the field of view of the photodetector 1306. Once the ellipse estimation module 1310 generates the coefficients, the module 1310 (or another module) may provide instructions to display an ellipse based upon the coefficients using, for instance, the display 1312. The user may then perform subsequent gestures to further refine a gesture (e.g., when establishing a baseline gesture, as previously described). In some implementations, the ellipse estimation module 1310 and/or an application 1326 that uses the coefficients for various parameters, may provide feedback to the user (e.g., displaying a predetermined ellipse superimposed with the generated ellipse). This feedback can allow the user to adjust gesture motions according to the feedback.

Generally, any of the functions described herein can be implemented using software, firmware, hardware (e.g., fixed logic circuitry), manual processing, or a combination of these implementations. For example, as implemented with a smart phone and/or a tablet computing device, an algorithm for determining an elliptical representation of a gesture can exist on an application processor and/or within a co-processor/subsystem. The terms "module" and "functionality" as used herein generally represent software, firmware, hardware, or a combination thereof. The communication between modules in the electronic device 1300 of FIG. 13 can be wired, wireless, or some combination thereof. In the case of a software implementation, for instance, the module represents executable instructions that perform specified tasks when executed on a processor, such as the processor 1302 with the electronic device 1300 of FIG. 13. The program code can be stored in one or more device-readable storage media, an example of which is the memory 1304 associated with the electronic device 1300 of FIG. 13.

Example Procedures

The following discussion describes procedures that may be implemented in an electronic device for detecting gestures. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 1300 of FIG. 13. The features of techniques described below are platform-independent, meaning that the techniques may be implemented on a variety of commercial electronic device platforms having a variety of processors.

Figure 15:
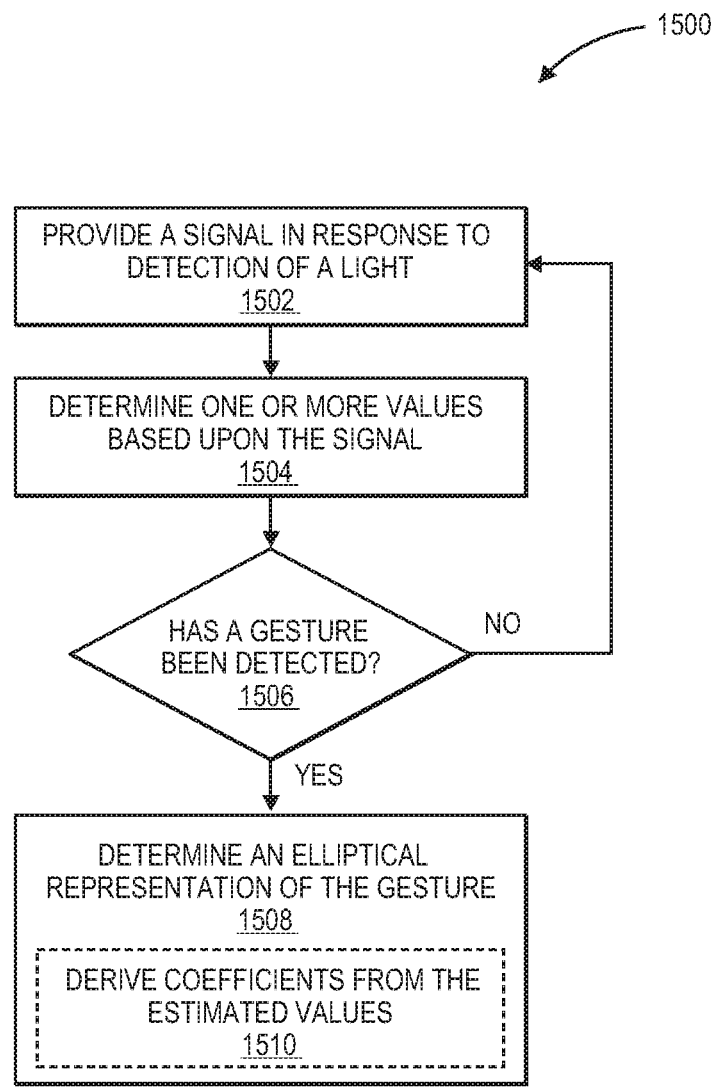
FIG. 15 is a flow diagram illustrating a method for determining a compact representation of a gesture in accordance with example implementations of the present disclosure.

FIG. 15 depicts a procedure 1500 in an example implementation in which an electronic device is configured to detect one or more gestures via a sensor. As shown in FIG. 15, a signal is provided by a sensor in response to the sensor detecting a gesture (Block 1502). For example, with reference to FIG. 13, photodetector 1306 may continually detect light reflected and/or transmitted from an object and provide a response thereto while the electronic device 1300 is operational. In some implementations, the photodetector 1306 may be configured to detect light generated from an illumination source 1307 (e.g., detecting light occurring within a limited spectrum of wavelengths) and generate signals corresponding to the characteristics of the light detected.

As shown in FIG. 15, one or more values are estimated based upon the signals generated by the sensor (Block 1504). With continuing reference to FIG. 13, once signals are generated by the photodetector 1306, the estimator 1308 receives the signals and is configured to estimate one or more values based upon the characteristics of the light represented by the signals. In implementations, the estimator estimates velocity vectors (e.g., a speed and an orientation of the gesture with respect to the photodetector) via suitable stochastic techniques of the detected gesture (e.g., using a Kalman estimator). The signals may represent a distinct gesture as detected by the photodetector 1306. For example, a single gesture may be defined for a time period from when the photodetector 1306 initially detects light reflected within the specific wavelength until the photodetector 1306 does not at least substantially detect light reflected within the specific wavelength (e.g., a hand passes over the photodetector 1306 and reflects light for a period of time).

The estimator may determine whether a gesture has been detected (Decision Block 1506). If the gesture is not complete (NO from Decision Block 1506), the estimator continues to receive signals from the photodetector and generates estimated values based upon the signals. When a completed gesture is detected (YES from Decision Block 1506), the estimator furnishes the estimated values, such as the velocity vectors, to the ellipse estimation module.

Then, an elliptical representation of the gesture is determined (Block 1508). For example, coefficients are derived from the estimated values (Block 1510). In implementations, five (5) coefficients are derived by the ellipse estimation module through a suitable ellipse estimation model, such as a Least Squares model (e.g., as previously described). The coefficients can comprise two (2) center coefficients that represent the center coordinates of the ellipse within a geographic (e.g., Cartesian) plane (Cx, Cy), two (2) radii coefficients that represent the radii values of the ellipse within the geographic plane (Rx, Ry), and one (1) coefficient that represents the orientation of the ellipse within the geographic plane (theta). Once the ellipse estimation module derives the coefficients, the coefficients may be used as parameters in various applications. For example, the coefficients may be used to transition between pages within an electronic book. In another implementation, the coefficients may be used to generate an ellipse for display via the electronic device.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An electronic device comprising:
   a sensor configured to detect intensity of light incident on the sensor and provide a signal in response thereto; and
   an estimator communicatively coupled to the sensor, the estimator configured to receive the signal from the sensor and generate one or more velocity vectors based upon the signal, the estimator configured to generate one or more estimated values corresponding to an elliptical representation of data representing a gesture being associated with the intensity of light incident on the sensor, wherein the elliptical representation comprises a plurality of coefficients generated in response to the generation of the one or more estimated values, the plurality of coefficients comprising a center coefficient representing a center coordinate of an ellipse within a geographic plane, a first radius coefficient representing a semi-major radius value of the ellipse within the geographic plane, a second radius coefficient representing a semi-minor radius value of the ellipse within the geographic plane, and a theta coefficient representing an orientation of the ellipse within the geographic plane.

2. The electronic device as recited in claim 1, further comprising an illumination source configured to emit light within a limited spectrum of wavelengths, wherein the sensor comprises a photodetector configured to detect light within the limited spectrum of wavelengths for detecting the intensity of light incident on the sensor.

3. The electronic device as recited in claim 1, wherein the estimator is further configured to derive at least one bias offset state.

4. The electronic device as recited in claim 1, wherein the estimator comprises a Kalman Estimator.

5. The electronic device as recited in claim 1, wherein the elliptical representation is determined using a Least Squares model.

6. The electronic device as recited in claim 1, wherein the sensor comprises a photodetector configured as at least one of a quad segmented photodetector, a 2×2 array of photodiodes, or a 4×4 array of photodiodes.

7. A system comprising:
  a sensor configured to detect light incident on the sensor and occurring within a limited spectrum of wavelengths and provide a signal in response thereto;
  a processor communicatively coupled to the sensor, the processor configured to receive the signal from the sensor;
  an estimator communicatively coupled to the processor, the estimator configured to generate one or more velocity vectors based upon the signal; and
  control programming executable on the processor and configured to generate an elliptical representation of data representing a gesture being associated with the light incident on the sensor based upon the one or more velocity vectors,
  wherein the elliptical representation comprises a plurality of coefficients generated in response to the generation of the one or more estimated values, the plurality of coefficients comprising a center coefficient representing a center coordinate of an ellipse within a geographic plane, a first radius coefficient representing a semi-major radius value of the ellipse within the geographic plane, a second radius coefficient representing a semi-minor radius value of the ellipse within the geographic plane, and a theta coefficient representing an orientation of the ellipse within the geographic plane, wherein the first radius coefficient representing the semi-major radius value of the ellipse corresponds to one or more velocity vectors, wherein the plurality of coefficients are generated based upon the one or more estimated values.

8. The system as recited in claim 7, wherein the estimator is a Kalman Estimator.

9. The system as recited in claim 7, wherein the signal represents one or more characteristics of the detected light comprising at least one of the intensity of the detected light incident upon the sensor, how long the light was incident upon the sensor, or the orientation of the detected light incident upon the sensor.

10. The system as recited in claim 7, further comprising a display configured to display the data representing the gesture.

11. The system as recited in claim 7, wherein the elliptical representation is determined using a Least Squares model.

12. The system as recited in claim 7, wherein the sensor comprises a photodetector configured as at least one of a quad segmented photodetector, a 2×2 array of photodiodes, or a 4×4 array of photodiodes.

13. A method comprising:
  receiving a signal from a sensor in response to the sensor detecting changes in intensity of light incident on the sensor and occurring within a field of view of the sensor;
  estimating one or more velocity vectors based upon the signal; and
  estimating one or more values based upon the velocity vectors, the one or more values corresponding to an elliptical representation of data representing a gesture being associated with the changes in intensity of light incident on the sensor,
  wherein the elliptical representation comprises a plurality of coefficients generated in response to the generation of the one or more estimated values, the plurality of coefficients comprising a center coefficient representing a center coordinate of an ellipse within a geographic plane, a first radius coefficient representing a semi-major radius value of the ellipse within the geographic plane, a second radius coefficient representing a semi-minor radius value of the ellipse within the geographic plane, and a theta coefficient representing an orientation of the ellipse within the geographic plane, wherein the first radius coefficient representing the semi-major radius value of the ellipse corresponds to one or more velocity vectors and an area of the ellipse corresponds to a size of an object causing the changes in intensity of light incident on the sensor.

14. The method as recited in claim 13, further comprising deriving a plurality of coefficients defining the elliptical representation.

15. The method as recited in claim 13, wherein estimating one or more values relating to the signal comprises estimating the one or more values relating to the signal using a Kalman Estimator.

16. The method as recited in claim 13, wherein the elliptical representation is determined using a Least Squares model.

* * * * *